Patented Sept. 9, 1952

2,610,202

UNITED STATES PATENT OFFICE 2,610,202

ESTERS OF POLYMERS OF MALEIC ANHYDRIDE AND BETA-MERCAPTOETHANOL AND PROCESS

Milton Kosmin and John Mann Butler, Dayton, Ohio, assignors to Monsanto Chemical Company, St. Louis, Mo., a corporation of Delaware No Drawing. Application June 24, 1949,
Serial No. 101,248

10 Claims. (Cl. 260—481)

This invention relates to a new family of chemical compositions and to their use as pour point depressants for lubricating oils. More specifically the invention relates to esters of the reaction product of maleic anhydride and β-mercaptoethanol.

Many of the commercially available petroleum stocks contain high molecular weight hydrocarbon waxes, and the lubricating fraction separated by various refining procedures contain a substantial proportion of the waxes dissolved therein. Upon cooling these lubricants, the dissolved waxes crystallize in such form that the fluidity of the lubricant is destroyed. It is known that some substances effect the crystallization of the wax and permit the lubricants to retain their fluidity after cooling below the normal pour points of the oils.

The purpose of this invention is to provide a new class of compounds having unusual utility as an additive for lubricating oils. A further purpose of this invention is to provide an effective means of reducing the pour points of wax containing lubricating oils.

The pour points of lubricating oils are measured by a standard A. S. T. M. procedure, by which a sample of oil is heated and then gradually cooled while observing the fluid characteristics of the sample at every 5° F. interval, the temperature being multiples of 5° F. The pour point is the lowest recorded temperature at which the sample is fluid. The details of the method of determining pour points are set forth in the American Society for Testing Materials Bulletin, on petroleum products and lubricants D–97–39.

It has been discovered that a new class of compounds, made by reacting maleic anhydride with β-mercaptoethanol and thereafter esterifying the product with a normal primary alcohol containing from twelve to eighteen carbon atoms, are valuable pour point depressing agents.

The new chemical compounds are prepared by reacting maleic anhydride and β-mercaptoethanol to form a relatively low molecular weight addition product. This reaction is preferably conducted with mol ratios of reactants varying from 2:1 to 1:2. The reaction may be catalyzed, if desired, with a small proportion of a free radical producing catalyst, for example a peroxide such as ascaridole or benzoyl peroxide. The chemical constitution of the polymeric intermediate has not definitely been ascertained. It is, however, believed to be a mixture of compounds including some or all of the following:

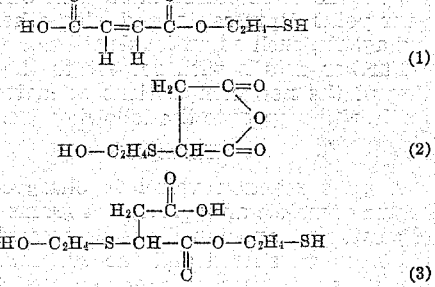

It will be noticed that the compounds represented by the structural formulae may condense with each other in any ratio to form alkyd polymers. Polymers of these types appear to be present in the intermediate compound. The proportions of the polymers and the addition products represented by formulae (1), (2) and (3) will depend upon the mol proportions of maleic anhydride and β-mercaptoethanol charged to the reaction.

The condensation of maleic anhydride with β-mercaptoethanol is preferably initiated by mixing the reagents at a moderate temperature, for example from 30° to 50° C. The reaction is exothermic, so the reaction mass need not be heated. After the initial reaction has subsided the reaction mass may be heated to higher temperatures, for example from 50° to 100° C. As a reaction proceeds the reaction mass becomes increasingly viscous and may be heated for several hours or several days, depending upon the desired molecular weight of the polymer. In general low molecular weight products are formed, for example those containing up to ten maleic acid groups per molecule. The average number of maleic acid units per molecule of polymer will usually be between two and three.

The polymers of maleic anhydride and β-mercaptoethanol are then reacted with normal primary alcohol containing twelve to eighteen carbon atoms or any mixture of said alcohols. Suitable alcohols are n-dodecyl alcohol, n-tetradecyl alcohol, n-hexadecyl alcohol, or mixtures of two or more of said alcohols or mixtures of alcohols containing a substantial portion of an alcohol having from twelve to eighteen carbon atoms in the molecule. The low molecular weight maleic anhydride polymer is esterified by mixing the alcohol and the polymer in the presence of a suitable hydrocarbon diluent, preferably a solvent for the reactants and, if desired, an esterification catalyst. The mixture is then refluxed until the theoretical quantity of water is evolved by esterification and recovered by a suitable trap in the condenser. Sufficient alcohol should be used to react with all available carboxylic acid radicals.

From 0.01 to five percent by weight of the new chemical compounds are useful in depressing pour points of oil but preferred practice involves the use of from 0.05 to two percent. The polymer is dissolved or dispersed in the lubricating oil by dissolving it directly and stirring it until a homogeneous mixture or solution is effected. It is frequently desirable to prepare master batches by dispersing or dissolving large amounts of the new compounds in a lubricating stock and thereafter mixing the concentrate with a suitable larger quantity of untreated oils, the proportions being chosen so as to achieve small but effective proportions of the new compound in the final lubricant.

The new compounds of this invention may be used alone or in combination with other known pour point depressants, and with other modifying agents, such as antioxidants and detergents.

Further details with respect to the preparation of the new compositions of matter are set forth with respect to the following examples.

Example 1

A glass reaction vessel is charged with 98 grams of maleic anhydride, 78.1 grams of β-mercaptoethanol and ten drops of ascaridole. The mixture was stirred and the evolution of heat caused an increase in temperature to 42° C. After the reaction had subsided as evidenced by a lowering of the reaction temperature, heat was applied and the temperature increased to 85° C., which was maintained for three hours. A very viscous liquid polymer was thereby obtained.

Example 2

A glass reaction flask was provided with a reflux condenser and a Dean and Stark trap for separation of water from the condensate. The flask was charged with 37.2 grams of a straight chain alcohol having twelve carbon atoms, 17.6 grams of the compounds prepared in accordance with Example 1, and 17 ml. of toluene. The flask and its contents were heated at reflux temperature until two ml. of water had been separated. The reaction mixture was then diluted with benzene, washed well with water and with sodium bicarbonate. After drying the solvent was evaporated.

Example 3

A glass reaction vessel, provided with a reflux condenser and a Dean and Stark trap for the separation of evolved water was charged with 44 grams of the polymer prepared in accordance with Example 1, 107 grams of n-tetradecanol and 50 ml. of toluene. The mixture was heated at the reflux temperature until 5 ml. of water had been removed. The product was diluted with an equal volume of benzene and washed with water and finally with sodium bicarbonate. After the solution was dried, the solvent was evaporated. A viscous liquid product was thereby obtained which solidified upon standing. The product was identified as the n-tetradecanol ester of the polymer prepared in accordance with Example 1.

Example 4

Using the procedure of the preceding examples, except that 40 grams of a mixture of alcohols consisting of 2.8 percent decanol, 61 percent dodecanol, 21 percent tetradecanol, 11 percent hexadecanol, and 2.2 percent octadecanol, was used for the esterification. The mixture was refluxed until three ml. of water had been evolved and separated. During the latter portion of the reaction two small crystals of toluenesulfonic acid were added to catalyze the reaction. The product was worked up in the manner described in the preceding examples.

Example 5

The utility of the compounds described in the preceding three examples was demonstrated by preparing one percent solutions of each in several different lubricating oils having pour points of 0° F., 20° F., 45° F., and 60° F., in each case. The pour points of the modified oils were measured by the standard A. S. T. M. procedure and the following observations were made:

| Compound of— | Lubricating oils having original pour of— | | | |
|---|---|---|---|---|
| | 0° F. | 20° F. | 45° F. | 60° F. |
| | °F. | °F. | °F. | °F. |
| Example 2 | −10 | 25 | 40 | -------- |
| Example 3 | -------- | 20 | 25 | 60 |
| Example 4 | 0 | 0 | 45 | -------- |

The above tabulation demonstrates that the derivatives of tetradecyl alcohol is an effective depressant for 45° F. pour oil, causing a reduction of 20° in the pour point. Similarly, the derivatives of dodecyl alcohol is an effective pour point depressant for 0° F. pour oil but not for other oils. The table also demonstrates that the derivatives made from a mixture of $C_8$ to $C_{18}$ alcohols is an effective pour point depressant for 20° pour oil, but is not effective on either 0° F. pour oil or 45° F. pour oil.

The invention is described with respect to the following claims.

1. A composition of matter made by the esterification of polymers of maleic anhydride and β-mercaptoethanol with primary normal alcohols having from twelve to eighteen carbon atoms, said polymers containing an average of at least two maleic anhydride units per molecule.

2. As a composition of matter the ester of a normal aliphatic alcohol having from twelve to eighteen carbon atoms with a polymer made by reacting from one to two mols of maleic anhydride with from two to one mol of β-mercaptoethanol, said polymer having an average of at least two maleic anhydride units per molecule.

3. As a composition of matter the dodecanol ester of a low molecular weight polymer made by reacting equal mols of maleic anhydride and β-mercaptoethanol, said polymer having an average of at least two maleic anhydride units per molecule.

4. As a composition of matter the tetradecanol ester of a low molecular weight polymer made by reacting equal mols of maleic anhydride and β-mercaptoethanol, said polymer having an average of at least two maleic anhydride units per molecule.

5. As a composition of matter mixtures of esters of aliphatic alcohols having from twelve to eighteen carbon atoms in the molecule and a low molecular weight polymer prepared by reacting equal mols of maleic anhydride and β-mercaptoethanol, said polymer having an average of at least two maleic anhydride units per molecule.

6. A method of preparing an oil additive which comprises reacting maleic anhydride and β-mercaptoethanol to form a polymer containing an average of at least two maleic anhydride units per molecule, and thereafter esterifying the said polymer with a primary alcohol having from twelve to eighteen carbon atoms.

7. A method of preparing an oil additive which comprises reacting from two to one mol of maleic anhydride and from one to two mols of β-mercaptoethanol to form a polymer containing an average of at least two maleic anhydride units per molecule, and thereafter esterifying the said polymer with a primary normal alcohol having from twelve to eighteen carbon atoms.

8. A method of preparing an oil additive which comprises reacting equal mols of maleic anhydride and β-mercaptoethanol to form a polymer containing an average of at least two maleic anhydride units per molecule, and thereafter esterifying the said polymer with n-dodecanol.

9. A method of preparing an oil additive which comprises reacting equal mols of maleic anhydride and β-mercaptoethanol to form a polymer containing an average of at least two maleic anhydride units per molecule and thereafter esterifying the said polymer with n-tetradecanol.

10. A method of preparing an oil additive which comprises reacting equal mols of maleic anhydride and β-mercaptoethanol to form a polymer containing an average of at least two maleic anhydride units per molecule, and thereafter esterifying the said polymer with a mixture of primary normal alcohols having from twelve to eighteen carbon atoms.

MILTON KOSMIN.
JOHN MANN BUTLER.

REFERENCES CITED

The following references are of record in the file of this patent:

UNITED STATES PATENTS

| Number | Name | Date |
| --- | --- | --- |
| 2,477,327 | Blake | July 26, 1949 |